United States Patent [19]

Burnham

[11] 4,316,810
[45] Feb. 23, 1982

[54] GELLED OIL BASE COMPOSITIONS AND METHODS OF PREPARATION AND USE OF SAME

[75] Inventor: John W. Burnham, Oklahoma City, Okla.

[73] Assignee: Halliburton Company, Duncan, Okla.

[21] Appl. No.: 109,984

[22] Filed: Jan. 7, 1980

Related U.S. Application Data

[63] Continuation-in-part of Ser. No. 898,056, Apr. 20, 1978, abandoned.

[51] Int. Cl.$^3$ .............................................. E21B 43/26
[52] U.S. Cl. ............................... 252/8.55 R; 166/308; 252/316
[58] Field of Search ............. 252/8.55 R, 8.5 M, 32.5; 166/283, 308

[56] References Cited

U.S. PATENT DOCUMENTS

| | | | |
|---|---|---|---|
| 3,020,303 | 2/1962 | Pianfetti et al. | 260/950 X |
| 3,331,896 | 7/1967 | Eiseman et al. | 260/950 X |
| 3,757,864 | 9/1973 | Crawford et al. | 252/8.55 X |
| 4,031,014 | 6/1977 | Griffin | 252/8.55 |
| 4,152,289 | 5/1979 | Griffin | 252/316 |
| 4,153,066 | 5/1979 | Griffin | 252/8.55 X |
| 4,153,649 | 5/1979 | Griffin | 260/950 |
| 4,174,283 | 11/1979 | Griffin | 252/8.55 R |

*Primary Examiner*—Herbert B. Guynn
*Attorney, Agent, or Firm*—John H. Tregoning; Thomas R. Weaver; William R. Laney

[57] ABSTRACT

Gelled oil base compositions useful in the fracturing of subterranean formations are prepared by incorporating aluminum salts of one or more oxaalkyl phosphates and/or oxaalkyl alkyl phosphates in an oil base fluid. The salts can be formed separately followed by addition of the salt to the oil, or the salt can be formed in situ by separately adding to the oil, the phosphoric acid ester and an aluminum compound which then react to form the salt. In the usage of these compositions for fracturing a subterranean formation, the composition is pumped into an oil or gas well, and from the well bore into the formation to form and propagate a fracture in the formation.

15 Claims, No Drawings

GELLED OIL BASE COMPOSITIONS AND METHODS OF PREPARATION AND USE OF SAME

RELATED APPLICATIONS

This application is a continuation-in-part of U.S. application Ser. No. 898,056 entitled "FRACTURING COMPOSITIONS AND METHODS OF PREPARATION AND USE OF SAME" filed Apr. 20, 1978, now abandoned.

This invention relates to gelled oil base compositions useful as fracturing fluids employed in oil and gas production, and to methods for preparing such compositions. The invention further relates to methods for preparing certain aluminum salts which, when incorporated in an oil base liquid, function to increase the viscosity of the liquid and also to reduce the frictional resistance to flow exhibited by the base fluid.

Throughout this disclosure the word "phosphate" is used interchangeably with orthophosphate and monophosphate. Accordingly, any reference to orthophosphate means phosphate and also means monophosphate. Any reference to phosphate means orthophosphate and also monophosphate, and any reference to monophosphate means phosphate and also orthophosphate.

In the fracturing of a subterranean formation for the purpose of enhancing the production of oil and/or gas therefrom, hydraulic pressure imparted by a fracturing fluid is utilized to produce, enlarge and propagate a fracture at a selected location in the formation. The sophistication of such fracturing procedures has attained a high level, and extends, in one facet, to the custom preparation and blending of the fracturing fluid utilized, in order to optimize its fracturing properties. Fracturing compositions are pumpable liquids, which include oil base liquids having various additives incorporated therein to improve or achieve certain desirable results when the composition is forced into the formation under high pressure.

It is highly desirable that a fracturing composition exhibit low frictional resistance to the flow of the composition in the well bore conduit during fracturing. Occasionally the oil base liquid used in fracturing will itself, and without modification, exhibit adequately low frictional resistance to flow to enable it to be successfully used in some types of subterranean fracturing. A number of compounds and mixtures of compounds have previously been proposed, and in sime cases, used, however, as friction-reducing additives to the oil base fluids to enhance their flow properties when used in fracturing. Among these are aluminum salts of aliphatic phosphates described in Crawford et al. U.S. Pat. No. 3,757,864. These compounds are described as being useful to reduce the frictional resistance to flow of an oil base liquid and further, when added in sufficient amounts, as being useful to increase the gel strength of such fracturing compositions.

Other types of aluminum salts of phosphate esters having utility as additives to oil base fracturing fluids are described in Griffin U.S. Pat. No. 4,174,283 issued Nov. 13, 1976; Griffin U.S. Pat. No. 4,153,649 issued May 8, 1979 and Griffin U.S. Pat. No. 4,152,289 issued May 1, 1979.

It is generally necessary that oil base compositions contemplated for use in fracturing have an adequately high viscosity to fracture the particular formation at the particular subterranean location where they are to be used. Since this parameter is situation dependent, and varies widely it is desirable, with a given fracturing fluid system, to have some flexibility in the manipulation of viscosity by variation in additive quantity and character. In any event, the viscosity must be sufficiently low that the fracturing fluid remains pumpable under the condition of usage.

The present invention relates to gelled oil base compositions which, by virtue of having relatively high viscosity and relatively low frictional resistance to flow, are useful as fracturing compositions. The compositions demonstrate improved solubility in certain hydrocarbon base fluids in relation to previously known, generally similar fracturing compositions. The invention further relates to methods of preparing and using such compositions. The compositions can be broadly described as consisting essentially of a pumpable, nonpolar oil base liquid and an aluminum phosphate compound present in the composition in an amount in the range of from about 0.25 to about 6.0 percent by weight of the composition, wherein the aluminum phosphate compound is selected from the group consisting of aluminum oxaalkyl phosphates and aluminum oxaalkyl alkyl phosphates and mixtures thereof. The term aliphatic is hereinafter sometimes used, when alluding to these phosphate salts, to refer to the substituents bonded to an oxygen atom, and variously denominated $R_1$, $R_2$, $R_3$ or $R_4$ in structural formulae. Such aliphatic substituents includes saturated, olefinic and/or acetylenic straight and/or branched chain subsituents. These compounds can be generically represented by the structural formula:

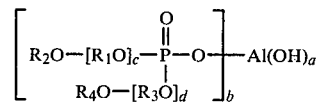

where
- $a = 0$ to 2,
- $b = 1$ to 3,
- $c = 1$ to 5,
- $d = 1$ to 5,
- and the sum of $a+b=3$;
- $R_1O$ and $R_3O =$ an alkyloxy, alkenyloxy or alkynyloxy group containing from 1 to 18 carbon atoms, or $CH_2CH(CH_3)O$, or $CH_2CH_2O$ or OH, and
- $R_2O$ and $R_4O =$ an alkyloxy, alkenyloxy or alkynyloxy group containing from 1 to 18 carbon atoms, and $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted.

From the foregoing definitions of structure it will be understood that in the term "oxaalkyl", the term "alkyl" is being used in the generic sense to include straight and branched chain, saturated and unsaturated aliphatic hydrocarbon groups.

The fracturing compositions can further contain certain conventional additives, including especially a propping agent, such as glass beads, walnut shells, sand or other hard particulate proppants know to the art.

In the preparation of the fracturing compositions of the invention, the aluminum salts can be initially prepared and then blended with the oil base liquid in the weight percentage range previously described. In preparing the salt, a phosphate ester is first prepared by reacting phosphorus pentoxide or other suitable phosphorus compounds with an ethereal or polyethereal alcohol, or mixture thereof, the structure of which will be governed by the particular desired values of the $R_1O$, $R_2O$, $R_3O$ and $R_4O$ groups within the definitions thereof as set forth in the above structural formula. The ethereal and polyethereal alcohols are synthesized by reacting selected aliphatic alcohols with varying amounts of ethylene oxide, or propylene oxide, or combinations thereof. The amount of ethylene oxide and/or propylene oxide used in synthesizing the alcohols determines the values of c and d in the stated structural formula, and is dependent on the carbon content of the groups $R_2O$ and $R_4O$. If an oxaalkyl alkyl ester is to be prepared, the phosphorus compound may be reacted with an aliphatic alcohol after it has been partially reacted with the ethereal alcohol, or the phosphorus compound may be concurrently reacted with a mixture of both types of alcohols.

After a phosphate ester is prepared, the aluminum salt is formed by reacting the ester with an alkali metal aluminate, aluminum isopropoxide, aluminum hydroxide or the like.

The aluminum salt can alternatively be prepared in situ. The phosphate ester is initially added to the oil base liquid, followed by addition of an alkali metal aluminate to form the salt in the base liquid.

In using the compositions of the invention in subterranean fracturing, the viscous fluid containing the aluminum salt can be further modified by the addition of propping agents, or other desired additives, and is then forced by pumping into the formation at a selected point to form a fracture. The methodology of subterranean fracturing is well understood in the art.

The described compositions as thus prepared exhibit good fluid flow properties, having reduced frictional resistance to movement into a fracture as it is being developed and propagated into a subterranean formation. The compositions are further characterized in having enhanced gel strength (relatively high viscosity), which facilitates the incorporation in a fracturing fluid in which the compositions are used of various additives, and particularly, larger particulate materials of the type used as propping agents.

Having broadly alluded to the compositions of the invention and their methods of preparation and usage, and having cited certain salient characteristics and advantages of fracturing fluids in which these compositions are usefully employed, the following description will be directed to a consideration of certain preferred embodiments of the invention, and to a detailed description of these embodiments in conjunction with examples set forth as illustrative of typical practice of the invention utilizing certain preferred embodiments.

The active or effective additive components of the oil base compositions prepared in accordance with the invention is, as has been indicated, an aluminum salt of an oxaalkyl phosphate ester or of an oxaalkyl alkyl phosphate ester. The structural formula of the aluminum salts constituting the additives has previously been set forth herein, and from such formula, the nature of the ester precursors of the salts can be broadly discerned. It will be noted that the salts of both mono- and diesters having either one or two oxaalkyl substituents are comprehended by the structural definition. Mixtures of salts variously substituted at the ester linkage can, of course, also be utilized. In the preferred salts added to the oleaginous base liquid to make up the compositions of the invention, such salts are derived from oxaalkyl phosphate esters in which, within the structural definition hereinbefore set forth, $R_1O$ contains from 1 to 3 of the group $CH_2CH_2O$, and from 3 to about 24 carbon atoms in the total chain constituted by the $R_2O$ and $R_1O$ groups together. The most preferred salts are the aluminum salts of phosphate diesters in which the oxaalkyl substituent contains from about 6 to about 16 carbon atoms, and the second ester substituent in the salt contains from 1 to about 16 carbon atoms.

The types of alcohols which can be reacted with phosphorus pentoxide, phosphorus oxychloride or a phosphorus halide compound to prepare the ester later reacted with an alkali metal aluminate substituent, can vary widely, as suggested by the structural definition of such oxaalkyl substituent of the final product as hereinbefore set forth. All of such alcohols are ethereal or polyethereal in character, and in each case contain one or more ether linkages, the number of which will be dictated and controlled by the amount of either ethylene oxide or propylene oxide utilized in the preparation of such alcohols. The particular chain length or carbon atom content of the ethereal or polyethereal alcohol utilized will also, of course, depend upon the utilmate ester compound which is to be produced.

Certain ethereal and polyethereal alcohols are preferred. These include, but are not limited to, 7, 10-dioxadodecan-12-ol; 7-oxanonanol; 5-oxaheptanol; 3-oxapentanol; 2-oxabutanol (ethylene glycol monomethyl ether); 9-methyl-10 oxadodecanol; oxtoxy-2-propanol; 1 methoxy-2-propanol; 11-oxatetradecan-13-ol; 9,12-dioxa-11 methylpentadecanol; 10-oxadodec-9-enol and 11-oxatridecanol. Other less preferred ethereal and polyethereal alcohols with can be utilized include 13, 16-dioxaoctadecanol; and 13-oxahexadec-7-yn-15-ol.

In forming the phosphate esters by reaction of the selected phosphorus compound with the described ethereal alcohols, mixtures of such alcohols can be utilized and reacted with the phosphorus compound employed to form a mixture of esters, which can then be reacted with sodium aluminate, or other appropriate aluminum compound as hereinafter described, to form a mixture of the salts having particular utility in fracturing compositions. It should be further pointed out that a mixture of esters will frequently result from the reaction of a given ethereal or polyethereal alcohol with the phosphorus compound used, in that both the dual sites for esterification of the phosphorus compound can be occupied by the oxaalkyl substituents in the case of a portion of the product, and a further portion be constituted by the monoester. As will be discerned from the foregoing description of preferred and useful ethereal and polyethereal alcohols which can be employed in synthesizing the phosphate esters, the term oxaalkyl as it is used herein connotes, by the "alkyl" suffix, saturated and unsaturated, branched and straight chain aliphatic groups in which one or more methylene subgroups have been replaced by oxygen.

Where oxaalkyl alkyl orthophosphate esters are to be prepared as precursors of the salts used in the fracturing composition, the ethereal or polyethereal alcohol, or mixture of such alcohols, is first reacted with the phosphorus pentoxide, or other appropriate phosphorus compound, to prepare the pyrophosphate. Synthesis of the pyrophosphate, either alone or in admixture with the oxaalkyl phosphate diester, is then followed by a further substitution of the pyrophosphate (having only the oxaalkyl substituents) with an alkyl group. This is accomplished by reaction of the initially formed oxaalkyl pyrophosphate ester with an amount of selected aliphatic alcohol or mixture of such alcohols. It should be pointed out that in actual practice, the described prepraration yields a mixture of oxaalkyl oxaalkyl phosphate diester, oxaalkyl phosphate monoester, oxaalkyl alkyl phosphate diester, alkyl phosphate monoester, and dialkyl phosphate diester. The aliphatic alcohols which are preferably employed are those which contain from 6 to 16 carbon atoms, and are normal alcohols or mixtures of normal alcohols having a chain length in this range. Less preferably, however, alcohols containing from 1 to 5 or 17 to 20 carbon atoms can be employed. Also, as pointed out previously, and as defined by the generic structural formula indicated to characterize the aluminum salts, the aliphatic alcohols used can contain olefinic or acetylenic unsaturation, and can be branched as well as straight chained. Saturated aliphatic alcohols are preferred. Examples of such preferred aliphatic alcohols are hexanol, octanol, undecanol, tetradecanol, hexadecanol, 6-methylnonanol, pentadecanol, heptanol, decanol and 4-ethyl tridecanol.

Although phosphorus pentoxide is the preferred phosphorus compound utilized in the preparation of the phosphorus esters, other phosphorus compounds, including phosphorus oxychloride and phosphorous halide, can be utilized. The phosphate esters are preferably prepared by adding phosphorus pentoxide slowly to the selected ethereal or polyethereal alcohol, with the addition carried out under a blanket of nitrogen. Where an ester containing both an oxaalkyl substituent and an alkyl substituent is to be prepared, the oxaalkyl substituent pyrophosphate is initially prepared using a quantitatively sufficient amount of ethereal or polyethereal alcohol to result in predominance of the pyrophosphate in the reaction product. Following the reaction of the phosphorus compound with the ethereal or polyethereal alcohol, the aliphatic alcohol is then added drop-wise to the reaction mixture, and the mixture is heated for an extended period of time to form the oxaalkyl alkyl phosphate.

After preparation of the described phosphoric acid esters, the aluminum salts of these esters are prepared by reaction of the esters with a basic aluminum compound. The aluminum compounds which can be employed include sodium (or other alkali metal) aluminate, aluminum isopropoxide or hydrated alumina. Preferably, the aluminum salts are prepared by adding to the phosphate ester, an aqueous solution of sodium hydroxide and sodium aluminate.

In the formation of the aluminum salts using the preferred sodium aluminate the phosphate ester and sodium aluminate are combined in a weight ratio of from about 7:1 to about 14:1, with about 10 parts of the phosphate ester to 1 part sodium aluminate being preferred. The most suitable form of the sodium aluminate for use in the reaction is an aqueous solution thereof which also contains sodium hydroxide, although the use of such aqueous solution is not essential. Sodium hydroxide and water are added to the sodium aluminate to form the aqueous reaction solution used in preparing the salts, with the amounts of NaOH and water thus added being such that these amounts, based on the weight of the final composition, range from about 0.11 to about 0.22 weight precent for the NaOH, and from about 0.05 weight percent to about 1.5 weight percent for the water.

Examples of phosphate esters useful in forming the aluminum salts employed in the fracturing compositions of the invention are 7,10-dioxadodecyl-y-oxanonyl phosphate; bis(7, 10-dioxadodecyl) phosphate; bis(7-oxanonyl) phosphate; 7-oxanonyl-2-oxabutyl phosphate; 5-oxanonyl-3-oxapentyl phosphate; 11-oxatridecyl phosphate; 5-oxaheptyl-9-oxaundecanyl phosphate; 13-methyl-11-oxatridecanyl phosphate; 11, 14-dimethyl 9, 12-dioxatetradecyl 4-oxahex-1-enyl phosphate; 7-oxanonyl octyl phosphate; 6-oxaoctyl methyl phosphate; and 4-methyl-2-oxabutyl nonyl phosphate.

A partial listing of aluminum phosphate salts constituting additives of the invention includes aluminum bis(7, 10-dioxadodecyl) phosphate; aluminum 4-methyl-2-oxabutyl nonyl phosphate; aluminum 4, 7-dioxanonyl-8-oxadecyl phosphate; aluminum 4-oxahex-1-enyl phosphate; aluminum 7-oxanonyl 2-oxabutyl phosphate; aluminum bis(7-oxanonyl) phosphate; aluminum 3-oxapentyl octyl phosphate; aluminum 5-methyl-7, 10-dioxadodecyl tetradecyl phosphate; aluminum 11, 14-dimethyl 9, 12-dioxatetradecyl phosphate and aluminum 6-butyl-12-methyl-10-oxadodecyl octyl phosphate.

A number of oil base liquids can be utilized as the principal component of the compositions to assure their usefullness as fracturing fluids, and these liquids are generally well known in the art. Such oil base liquids include kerosene, gas oil, diesel oil and certain types and mixtures of crude oil. Kerosene is a preferred base material.

The amount of the aluminum oxaalkyl phosphate salt which is added to the oil base liquid is from about 0.25 weight percent to about 6.08 weight percent. Preferably, at least 0.5 weight percent is added to the oil base liquid, and the most preferred composition contains from about 1.0 weight percent to about 2.0 weight percent. As previously indicated herein, the salt can be pre-prepared and then added to the oil base liquid, or can be formed in situ. The latter procedure constitutes the preferred method of incorporation of the salt in an oil base fracturing composition, since better control of the properties of the fracturing composition is thereby achieved.

Where in situ formation of the salt is the procedure followed, the phosphoric acid ester is initially added to the oil base fluid in an amount of from about 0.23 to about 5.3 weight percent. The sodium aluminate is then added in an amount of from about 0.02 to about 0.5 weight percent. As the sodium aluminate is added to the oil base, the most satisfactory performance as a fracturing composition is obtained by concurrently adding, as hereinbefore described, from about 0.01 to about 0.22 weight percent sodium hydroxide, and from about 0.05 to about 1.15 weight percent water, based upon the final weight of the fracturing composition. Preferably, on this basis, at least 0.02 weight percent of NaOH is added, and at least 0.06 weight percent of NaOH is added, and at least 0.06 weight percent water is added.

The following examples illustrate the preparation of the phosphate esters constituting the aluminum salt precursors hereinbefore described, and are also illustrative of the preparation of the aluminum salts and final preparation of compositions of the invention having particular utility as fracturing fluids. The examples also illustrate the use of the composition in fracturing a subterranean formation.

EXAMPLE 1

41.1 of ALFOL 610 (a commercially available mixture of aliphatic alcohols which is hereinafter more specifically defined) and 27 g of 3-oxapentanol are placed in a four-neck, 250 ml resin reaction flask. While the mixture of alcohols in the flask is being stirred, 28.4 g of $P_2O_5$ are added under a blanket of nitrogen and over a period of 30 minutes. The contents of the flask are then heated to 120° C. and retained at this temperature for one hour. After cooling the reaction mixture, 2.5 ml of the phosphate ester mixture formed are added to 250 ml of kerosene, and the aluminum salt then prepared in situ as hereinafter described in Example 6.

EXAMPLE 2

Using a second technique for the preparation of the phosphate esters, 60 g (0.3 mole) of tridecanol and 22.8 g (0.3 mole) of 2-oxabutanol are added to a three-neck, 250 ml reaction flask containing 28.4 g (0.2 mole) of $P_2O_5$ under dry nitrogen. The alcohols are added over a period of 20 minutes while cooling the flask in an ice water bath. Upon completion of the alcohol addition, the reaction flask is immersed in an oil bath at 140° C., and upon attainment of this temperature by the reaction mixture, is retained in the bath at this temperature for two hours. The aluminum salt of the ester mixture thus prepared is formed using the procedure described in Example 4.

EXAMPLE 3

Using 22 g (0.15 mole) of 7-oxanonanol and 11.5 g (0.15 mole) of 2-oxabutanol with 14.2 g (0.1 mole) of $P_2O_5$, a phosphate ester mixture is prepared using the preparation technique described in Example 1. The aluminum salts of the product esters are then prepared in the manner described in Example 5.

EXAMPLE 4

25 g of sodium aluminate ($NaAlO_2$) and 11 g of sodium hydroxide are dissolve in 64 g of dionized water. To 250 ml of kerosene are then added 2.5 ml of the mixture of phosphate ester prepared in Example 2. The solution is agitated while 0.75 ml of the aqueous solution containing sodium aluminate and sodium hydroxide is added. As the aluminum salt begins to form, a substantial increase in the viscosity of the reaction mixture is immediately noted.

EXAMPLE 5

2.5 ml of the mixture of phosphate esters prepared in Example 3 are added to 250 ml of kerosene. The solution is agitated while 0.75 ml of an aqueous solution of sodium aluminate and sodium hydroxide is added to the reaction mixture. The reaction mixture immediately commences to rapidly increase in viscosity.

EXAMPLE 6

25 g of $AlCl_3.6H_2O$ and 50 ml of water are mixed in a reaction flask. To this solution are added 22 ml of 50 percent sodium hydroxide with concurrent stirring. 2.5 ml of the phosphate esters prepared as described in Example 1 are then mixed with 3.5 ml of the aqueous aluminum chloride solution in 250 ml of kerosene. Increased viscosity resulting from gelation is immediately noticed upon combination of the reactants.

EXAMPLE 7

Phosphoric acid esters used in the formation of the salts are prepared using the procedure described in Examples 1 and 4, using equal molar amounts of the types of alcohols identified in the several runs summarized in Tables I and II. The aluminum-salts of the esters are prepared in the manner described in Example 4. Fracturing compositions are prepared in kerosene at 80° F. using 1.43 weight percent of the aluminum salt. The viscosities of the several fracturing compositions thus prepared are then measured, using a Brookfield Viscometer, Model LVS, with a No. 4 spindle at 6 rpm. The viscosities of fracturing compositions prepared using the aluminum salts of several oxaakyl and oxaakyl alkyl phosphate esters are presented in Tables I and II.

TABLE I
VISCOSITY DATA FOR ALUMINUM OXAAKYL ALKYL PHOSPHATES

| Run | Oxaalkyl Alcohol(s) | Alkyl Alcohol(s) | Viscosity (cp) |
|---|---|---|---|
| 1 | 2-oxabutanol | octanol | 20,000 |
| 2 | 2-oxabutanol | ALFOL 610[a] | 17,000 |
| 3 | 2-oxabutanol | n-tridecanol | 500 |
| 4 | 2-oxabutanol | ALFOL 1216[b] | 12,000 |
| 5 | 2-oxabutanol | n-octadecenol | 500 |
| 6 | 3-oxapentanol | ALFOL 610 | 14,000 |
| 7 | 5-oxaheptanol | octanol | 15,000 |
| 8 | 5-oxaheptanol | ALFOL 610 | 17,000 |
| 9 | 5-oxaheptanol | ALFOL 1216 | 3,500 |
| 10 | 7-oxanonanol | methanol | 1,500 |
| 11 | 7-oxanonanol | ethanol | 5,000 |
| 12 | 7-oxanonanol | propanol | 4,000 |
| 13 | y-oxanononanol | butanol | 7,000 |
| 14 | 7, 10-dioxadodecanol 9, 12-dioxatetradecanol 11,14-dioxahexadecanol | ethanol | 1,500 |
| 15 | 11-oxatridecanol 11, 14-dioxahexadecanol | ethanol | 1,500 |
| 16 | 13-oxapentadecanol 13, 16-dioxaoctadecanol | ethanol | 1,000 |

[a]ALFOL 610 is a commercially available mixture of alkanols available from Continental Oil Company and containing 18 weight percent hexanol, 36 weight percent octanol and 46 weight percent decanol.
[b]ALFOL 1216 is a commercially available mixture of alkanols available from Continental Oil Company and containing 65 weight percent dodecanol, 25 weight percent tetradecanol and 10 weight percent hexadecanol.

TABLE II
VISCOSITY DATA FOR ALUMINUM OXAALKYL PHOSPHATES

| Run | Oxxalkyl Alcohol(s) 1 | Oxaalkyl Alcohol(s) 2 | Viscosity (cp) |
|---|---|---|---|
| 1 | 2-oxabutanol | 7-oxanonanol | 4,000 |
| 2 | 2-oxabutanol | 9-oxaundecanol 11-oxatridecanol | 1,000 |
| 3 | 3-oxapentanol | 7-oxanonanol | 4,500 |
| 4 | 5-oxaheptanol | 7-oxanonanol | 4,000 |
| 5 | 5-oxaheptanol | 10-oxadodecanol | 2,000 |
| 6 | 5-oxaheptanol | 9-oxaundecanol 11-oxatridecanol | 4,000 |
| 7 | 7-oxanonanol | 7-oxanonanol | 12,000 |
| 8 | 7-oxanonanol | 10-oxadodecanol | 1,000 |

EXAMPLE 7

Phosphorus pentoxide is reacted with 7-oxanonanol to yield a mixture of esters containing bis(7-oxanonyl)-phosphate, and 7-oxanonyl phosphate. Ten gallons of the ester mixture and three gallons of the previously described aqueous solution of sodium aluminate and sodium hydroxide are then added to 1000 gallons of kerosene. The viscosity of the resulting gel, as measured on a Model LVF Brookfield Viscometer with a No. 3 spindle at 6 rpm is 6,600 cp.

For purposes of comparison, alkyl phosphate esters of the general type heretofore used as fracturing composition additives are prepared by reacting phosphorus pentoxide with hexanol. An attempt to add ten gallons of the ester product to kerosene, along with the aqueous sodium aluminate, shows that the hexyl phosphates are of very limited solubility in kerosene. Gelling of the kerosene does not occur, and only a slight increase in viscosity is noted.

Tests of the fracturing compositions containing the aluminum oxaalkyl phosphate salts of the invention show such compositions to be equivalent or better than commercially available compositions in frictional resistance to flow.

In using the fracturing compositions prepared in accordance with the invention, they are injected under pressure into the formation from the well bore in general conformity with fracturing techniques well understood in the art. The compositions can be utilized for fracturing over substantially any practical pressure range, since the fracturing composition gels are not shear destructible. Fracturing is preferably carried out at a temperature of between about 50° F. and 250° F. Injection can be accomplished at a flow rate of from about 80 to 6,400 gallons per minute, depending, of course, on the particular receptivity of the fracture being formed. Preferably, at the time of commencing the fracturing, or subsequently as the fracture is enlarged, one or more conventional proppants are added to the high viscosity composition, and by suspension therein are carried into the fracture for propping purposes.

EXAMPLE 9

An untested new oil and gas producing well 5,110 feet in depth is fracture treated using an aluminum oxaalkyl alkyl phosphate in a kerosene base fluid. The well has a static bottom hole temperature of 140° F. The kerosene base gel, prepared on the surface, contains an aluminum oxaalkyl alkyl phosphate salt prepared by adding 10 gallons of a phosphate ester (prepared by reacting phosphorus pentoxide with a mixture of hexanol, octanol, decanol and 2-oxabutanol) and 3 gallons of sodium aluminate-sodium hydroxide solution to 20,000 gallons of kerosene. The gel as thus prepared is aged for about 6 hours. The viscosity of the prepared gel is 17,000 cp. The gell is pumped downhole at a rate of 23 barrels per minute and a pumping pressure of approximately 3,500 psi. In the course of pumping the gel into the well bore, proppant material is added to the gel to enable a total of 27,500 pounds of the proppant to be placed in the fracture zone. Pressure drop calculations indicate that percent friction reduction for the gel compared to the ungelled base fluid is 60 percent. Production after the fracturing treatment is approximately 500 BPD.

EXAMPLE 10

An untested new oil and gas producing well having a depth of 1,370 feet has a static bottom hole temperature of 80° F. The well is fracture treated using diesel No. 2 base fluid containing an aluminum oxaalkyl alkyl phosphate. In making the fracturing gel, an aluminum salt, prepared by mixing, in situ, 10 gallons of an oxaalkyl alkyl phosphate and 3 gallons of sodium aluminate-sodium hydroxide solution is added to 29,000 gallons of the diesel oil. The gel which is formed upon reaction of the ester and sodium aluminate-sodium hydroxide solution is aged for 18 hours. The oxaalkyl alkyl phosphate is prepared by reacting phosphorus pentoxide with hexanol, octanol, decanol and 2-oxabutanol. Viscosity of the fracturing fluid is 12,000 cp. The fracturing gel is pumped downhole at a pumping rate of 40 barrels per minute and a pumping pressure of approximately 1,500 psi. In the course of pumping the gel into the fracturing zone, 10–20 and 8–12 sand is added to the slurry as a proppant material. A total of 39,000 pounds of sand is placed in the fracture zone. Friction reduction in the pipe for the fracturing gel is determined to be 65% compared to the ungelled base fluid. After fracturing stimulation, the well initially produces at 480 BPD. After six months production is 84 BPD.

Although certain preferred embodiments of the invention have been herein described for illustrative purposes, it will be appreciated that various modifications and innovations in the procedures and compositions cited may be effected without departure from the basic principles which underlie the invention. Changes of this type are therefore deemed to lie within the spirit and scope of the invention except as the same may be necessarily limited by the appended claims or reasonable equivalents thereof.

What is claimed is:

1. A fracturing composition consisting essentially of: an oil base liquid; and from about 0.25 weight percent to about 6.0 weight percent of at least one compound selected from the group of aluminum salts consisting of aluminum oxaalkyl phosphates, aluminum oxaalkyl oxaalkyl phosphates and aluminum oxaalkyl alkyl phosphates, said salts having the structural formula

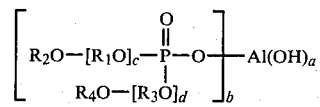

where
a = 0 to 2,
b = 1 to 3,
c = 1 to 5,
d = 1 to 5,
and the sum of a+b = 3;
$R_1O$ and $R_3O$ = an alkyloxy, alkenyloxy or alkynyloxy group containing from 1 to 18 carbon atoms, or $CH_2CH(CH_3)O$, or $CH_2CH_2O$ or OH, and $R_2O$ and $R_4O$ = an alkyloxy, alkenyloxy or alkynyloxy group containing from 1 to 18 carbon atoms, and where $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ and $R_4O$ group otherwise bonded thereto shall be deleted and further provided that the number of carbon atoms in at least one of R₁O, R₂O, R₃O and R₄O is at least 6.

2. A fracturing composition as defined in claim 1 wherein said oil base liquid is kerosene.

3. A fracturing composition as defined in claim 1 wherein said aluminum salt is an aluminum salt of an oxaalkyl alkyl phosphate ester.

4. A fracturing composition as defined in claim 1 and further characterized as including an effective amount of a propping agent.

5. The fracturing composition as defined in claim 1 wherein the alkyl group contains from about 6 to about 16 carbon atoms.

6. A fracturing composition as defined in claim 5 wherein the oxaalkyl substituent contains from about 6 to about 16 carbon atoms.

7. The method of preparing a fracturing composition which comprises incorporating in an oil base liquid, from about 0.25 to about 6.0 weight percent of at least one compound selected from the group of aluminum salts consisting of aluminum oxaalkyl phosphates, aluminum oxaalkyl oxaalkyl phosphates, and aluminum oxaalkyl alkyl phosphates, said salts having the structural formula

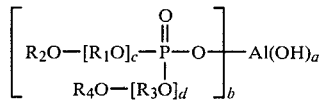

where
a = 0 to 2,
b = 1 to 3,
c = 1 to 5,
d = 1 to 5,
and the sum of a+b = 3,

R₁O and R₃O = an alkyloxy, alkenyloxy or alkynyloxy group containing from about 1 to 18 carbon atoms, or CH₂CH(CH₃)O, or CH₂CH₂O or OH, and R₂O and R₄O = an alkyloxy, alkenyloxy or alkynyloxy group containing from 1 to 18 carbon atoms, and where R₁O and R₂O may differ from each other but shall together contain from 1 to 24 carbon atoms, and R₃O and R₄O may differ from each other but shall together contain from 1 to 20 carbon atoms, provided that at least one of R₁O and R₃O shall be either CH₂CH(CH₃)O or CH₂CH₂O, and provided further that where either R₁O or R₃O is neither CH₂CH(CH₃)O nor CH₂CH₂O, then the respective R₂O or R₄O group otherwise bonded thereto shall be deleted and further provided that the number of carbon atoms in at least one of R₁O, R₂O, R₃O and R₄O is at least 6.

8. The method defined in claim 7 and further characterized as including the further step of adding an effective amount of a particulate propping agent to the mixture of oil base liquid and one or more aluminum salts.

9. The method defined in claim 7 wherein said salt or mixture of salts is incorporated in the oil base mixture by forming the salt or salts in situ in the oil base liquid.

10. The method defined in claim 9 wherein the salt or salts are formed in situ by adding to the oil base liquid from about 0.23 weight percent to about 5.3 weight percent of at least one phosphate ester selected from the group consisting of oxaalkyl phosphates, oxaalkyl oxaalkyl phosphates, and oxaalkyl alkyl phosphates, in which ester the oxaalkyl group contains from about 6 to 16 carbon atoms; then adding to the mixture of oil base liquid and ester, from about 0.02 to about 0.5 weight percent of an alkali metal aluminate.

11. The method of fracturing a subterranean formation which comprises:

admixing with an oil base fluid, from about 0.25 weight percent to about 5.5 weight percent of at least one compound selected from the group of aluminum salts consisting of aluminum oxaalkyl phosphate, aluminum oxaalkyl oxaalkyl phosphate and aluminum oxaalkyl alkyl phosphate, said salts having the structural formula

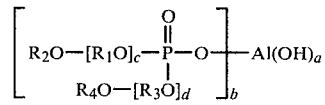

where
a = 0 to 2,
b = 1 to 3,
c = 1 to 5,
d = 1 to 5,
and the sum of a+b = 3;

R₁O and R₃O = an alkyloxy, alkenyloxy or alkynyloxy group containing from 1 to 18 carbon atoms, or CH₂CH(CH₃)O, or CH₂CH₂O or OH, and R₂O and R₄O = an alkyloxy, alkenyloxy or alkynyloxy group containing from 1 to 18 carbon atoms, and where R₁O and R₂O may differ from each other but shall together contain from 1 to 24 carbon atoms, and R₃O and R₄O may differ from each other but shall together contain from 1 to 20 carbon atoms, provided that at least one of R₁O and R₃O shall be either CH₂CH(CH₃)O or CH₂CH₂O, and provided further that where either R₁O or R₃O is neither CH₂CH(CH₃)O nor CH₂CH₂O, then the respective R₂O or R₄O group otherwise bonded thereto shall be deleted and further provided that the number of carbon atoms in at least one of R₁O, R₂O, R₃O and R₄O is at least 6; then pumping the mixture via a bore hole into a formation adjacent the bore hole at a formation fracturing pressure to fracture the formation.

12. The method defined in claim 11 wherein said mixture is pumped into the formation at a flow rate of from about 80 to about 6,400 gallons per minute.

13. The method defined in claim 11 and further characterized by the step of adding a propping agent to the mixture prior to pumping the mixture into the formation.

14. A gelled, oil base composition consisting essentially of:

an oil base liquid; and from about 0.25 weight percent to about 6.0 weight percent of at least one compound selected from the group of aluminum salts consisting of aluminum oxaalkyl phosphates, aluminum oxaalkyl oxaalkyl phosphates and aluminum oxaalkyl alkyl phosphates, said salts having the structural formula $$\left[ R_2O-[R_1O]_c-\overset{\overset{O}{\|}}{\underset{R_4O-[R_3O]_d}{P}}-O \right]_b Al(OH)_a$$

where
a = 0 to 2,
b = 1 to 3,
c = 1 to 5,
d = 1 to 5,
and the sum of a+b=3;
$R_1O$ and $R_3O$ = an alkyloxy, alkenyloxy or alkynyloxy group containing from 1 to 18 carbon atoms, or $CH_2CH(CH_3)O$, or $CH_2CH_2O$ or $OH$, and
$R_2O$ and $R_4O$ = an alkyloxy, alkenyloxy or alkynyloxy group containing from 1 to 18 carbon atoms,
and where $R_1O$ and $R_2O$ may differ from each other but shall together containing from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ and $R_4O$ group otherwise bonded thereto shall be deleted and further provided that the number of carbon atoms in at least one of $R_1O$, $R_2O$, $R_3O$ and $R_4O$ is at least 6.

15. The method of preparing a gelled, oil base composition which comprises incorporating in an oil base liquid from about 0.25 to about 6.0 weight percent of at least one compound selected from the group of aluminum salts consisting of aluminum oxaalkyl phosphates, aluminum oxaalkyl oxaalkyl phosphates, and aluminum oxaalkyl alkyl phosphates, said salts having the structural formula $$\left[ R_2O-[R_1O]_c-\overset{\overset{O}{\|}}{\underset{R_4O-[R_3O]_d}{P}}-O \right]_b Al(OH)_a$$

where
a = 0 to 2,
b = 1 to 3,
c = 1 to 5,
d = 1 to 5,
and the sum of a+b=3;
$R_1O$ and $R_3O$ = an alkyloxy, alkenyloxy or alkynyloxy group containing from 1 to 18 carbon atoms, or $CH_2CH(CH_3)O$, or $CH_2CH_2O$ or $OH$, and
$R_2O$ and $R_4O$ = an alkyloxy, alkenyloxy or alkynyloxy group containing from 1 to 18 carbon atoms,
and where $R_1O$ and $R_2O$ may differ from each other but shall together contain from 1 to 24 carbon atoms, and $R_3O$ and $R_4O$ may differ from each other but shall together contain from 1 to 20 carbon atoms, provided that at least one of $R_1O$ and $R_3O$ shall be either $CH_2CH(CH_3)O$ or $CH_2CH_2O$, and provided further that where either $R_1O$ or $R_3O$ is neither $CH_2CH(CH_3)O$ nor $CH_2CH_2O$, then the respective $R_2O$ or $R_4O$ group otherwise bonded thereto shall be deleted and further provided that the number of carbon atoms in at least one of $R_1O$, $R_2O$, $R_3O$ and $R_4O$ is at least 6.

* * * * *

UNITED STATES PATENT AND TRADEMARK OFFICE
CERTIFICATE OF CORRECTION

PATENT NO. : 4,316,810
DATED : February 23, 1982
INVENTOR(S) : BURNHAM John W.

It is certified that error appears in the above-identified patent and that said Letters Patent are hereby corrected as shown below:

Column 1, at line 49, the word "sime" should read --some--

Column 3, at line 4, the word "know" should read --known--,

Column 7, at line 9, delete the number [41.1] and insert therefor --41.1g--

Signed and Sealed this

Second Day of November 1982

[SEAL]

Attest:

Attesting Officer

GERALD J. MOSSINGHOFF

Commissioner of Patents and Trademarks